E. RAMSAY.
BRAKE MECHANISM FOR CARS.
APPLICATION FILED OCT. 26, 1909.

950,345.

Patented Feb. 22, 1910.

Witnesses:
Mary S. Handy.
G. M. Copenhaver.

Inventor:
Erskine Ramsay.
By Smith & Frazer
Attys.

UNITED STATES PATENT OFFICE.

ERSKINE RAMSAY, OF BIRMINGHAM, ALABAMA.

BRAKE MECHANISM FOR CARS.

950,345.  Specification of Letters Patent.  Patented Feb. 22, 1910.

Application filed October 26, 1909. Serial No. 524,768.

*To all whom it may concern:*

Be it known that I, ERSKINE RAMSAY, a citizen of the United States, and resident of Birmingham, in the county of Jefferson and State of Alabama, have invented certain Improvements in Brake Mechanism for Cars, of which the following is a specification.

My invention relates to brake mechanism for cars, and especially to such mechanism adapted for use on mine and other like cars.

In the brake mechanism usually employed on mine cars, the connection between the brake rods, which directly move the brake blocks or shoes toward and from car wheels, is such that the brake shoes on opposite sides of the car must travel a fixed distance, because the amount of movement imparted by the brake lever to the brake rods is fixed and the same for each side. As a result, the brake shoes must be nicely adjusted, as otherwise the pressure of the shoes on the wheels on both sides of the car will not be the same, and in consequence, the wheels on one side of the car may be braked while those on the other side would be free. Furthermore, wear on the brake shoes or blocks must be the same, regardless of whether one brake block might wear faster than the other with the same pressure on the wheels, as unequal wear would render inoperative one of the shoes or blocks, necessitating renewal of such block; and in taking off a block, when worn or broken, it would also be necessary to take off the other; or it would require considerable adjustment to bring the new block and the old block, if retained, in proper relation to insure the equal pressure upon the wheels on both sides of the car.

The object of my invention is to overcome the difficulties above described by providing an equalizing element in the brake operating connection adapted to insure the same pressure of the brake blocks or shoes, on the wheels on opposite sides of the car, under all conditions, and with this object in view my invention consists in the novel construction of brake mechanism and details thereof, as hereinafter described, with reference to the accompanying drawings, and more particularly pointed out in the claims.

Figure 1:
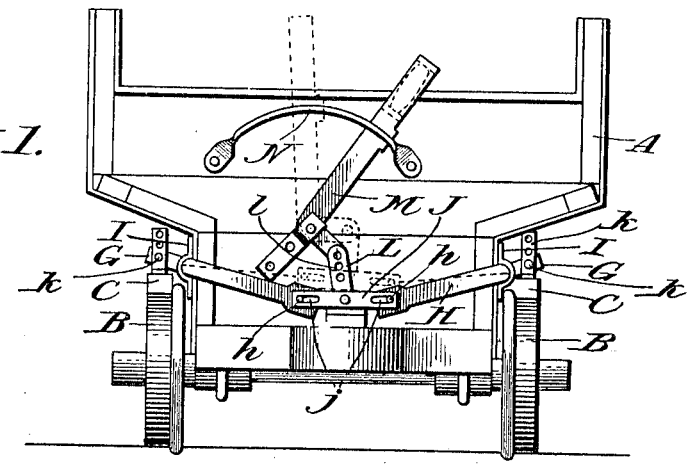
Figure 2:
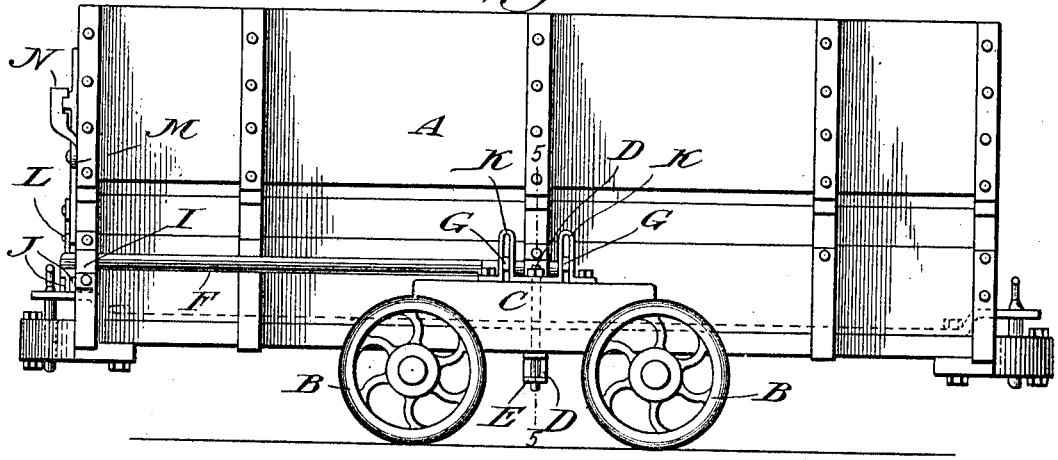
Figure 3:
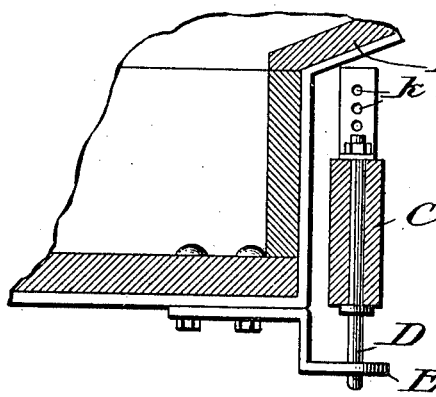

In the drawings: Figure 1 is an end view of a mine car, showing my invention applied thereto; Fig. 2 is a side elevation; and Fig. 3 is a fragmentary section through the brake block on line 5—5 of Fig. 2, showing the manner of connecting the same to the car frame.

Referring to the drawings, in which the same reference characters designate the same or corresponding parts in all the views, the letter A designates the body of a mine or other car mounted upon wheels B. Mounted between the wheels on each side of the car is a brake block C, vertically movable between the said wheels, to which block is secured a guide rod D, passing through and guided by a bracket E, fixed to the car body. The opposite ends of the brake blocks C are shaped and adapted to bear upon the peripheries of the car wheels B, to brake the same. On each side of the car is a rock shaft F, mounted in bearings I, having arms G extending outwardly and pivotally connected to straps K, secured to the upper side of the brake block. Extending inwardly from the said rock shaft F are arms H connected by equalizing bar or bars J, in the opposite ends of which bars are slots $j$ engaging pins $h$ extending from each of the arms H, thereby forming an adjustable connection between said equalizing bars and each of said arms H. Pivotally connected with the bars J is a link L having a pivotal connection with the brake operating lever M, provided with a suitable handle and confined by a suitable notched guide N, attached to the end of the car.

With the construction described, it will be observed that upon moving the brake lever M to the left, Fig. 1, the equalizing bars J will transmit motion to the brake shoes through the arms H and the rock shafts F on each side of the car, imparting a downward movement to the brake blocks causing the same to bear upon the wheels to brake the same. By reason of the pivotal adjustable connection between the arms H on the opposite sides of the cars, through the medium of the equalizing bars J, it will be obvious that the same pressure will be transmitted by the brake shoes on the opposite sides of the cars, regardless of the extent of movement of the inner end of the levers H, necessary to impart such pressure, since the equalizing bars will adjust themselves, as indicated in dotted lines, Fig. 1, according to the distance each block must move to cause it to bear upon the wheels with the same pressure.

In order to provide for separate adjustment of the brake blocks, the straps K are provided with a series of holes k, through any one of which the bolt connecting the arms G with the straps may be passed. Similarly, the link L is provided with a series of holes l through any one of which the bolt connecting the lever M with said link may be passed. It will thus be seen that it is not necessary to effect nice adjustment of the brake shoes with respect to the car wheels, in order to insure the same braking pressure on each side of the car, as in the former devices of this kind, nor would it be necessary to replace both brake blocks when one happens to be worn out or is broken.

I claim as my invention:

1. In a brake mechanism for mine and other cars, the combination with the wheels on opposite sides of the car, of a single brake block vertically movable between the wheels on each side of the car and bearing upon both wheels, a brake operating shaft on each side connected to the blocks, an equalizing connection between said shafts for permitting them to move different distances in applying the brakes, and a brake lever having a pivotal connection therewith, substantially as described.

2. In a brake mechanism for mine and other cars, the combination with the wheels on opposite sides of the car, of brake blocks adapted to move from and toward the wheels, a brake lever, brake operating shafts on opposite sides of the car connected to the brake blocks, an equalizing bar or bars connecting said shafts and brake lever, substantially as described.

3. In a brake mechanism for mine and other cars, the combination with the wheels on opposite sides of the car, of brake blocks movable toward and from said wheels, rock shafts on opposite sides of the car connected to the brake blocks and having arms extending inwardly, equalizing bar or bars pivotally connecting said arms, and a brake lever pivotally connected to said equalizing bar or bars, substantially as described.

4. In a brake mechanism for mine or other cars, the combination with the wheels on opposite sides of the car, of brake blocks movable toward and from said wheels, rock shafts mounted on opposite sides of the car having outwardly extending arms connected to the brake blocks, and arms extending inwardly, equalizing bar or bars pivotally connecting said arms, and a brake lever connected to said bar or bars, substantially as described.

In testimony whereof, I have signed my name to this specification, in the presence of two subscribing witnesses.

ERSKINE RAMSAY.

Witnesses:
R. D. CURRY,
W. A. FARISS.